United States Patent
Smith et al.

(10) Patent No.: US 9,927,015 B2
(45) Date of Patent: Mar. 27, 2018

(54) METHOD OF FORMING TORQUE CONVERTER STATOR

(71) Applicant: Schaeffler Technologies AG & Co. KG, Herzogenaurach (DE)

(72) Inventors: Matthew Smith, Wooster, OH (US); Jeremy Jewell, Wooster, OH (US); Timothy Hess, Westlake, OH (US); Jed Acker, Shreve, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 58 days.

(21) Appl. No.: 14/961,190

(22) Filed: Dec. 7, 2015

(65) Prior Publication Data
US 2017/0159782 A1    Jun. 8, 2017

(51) Int. Cl.
   *F16H 41/28*    (2006.01)

(52) U.S. Cl.
   CPC ....... *F16H 41/28* (2013.01); *F16H 2041/285* (2013.01)

(58) Field of Classification Search
   CPC ..... F16H 41/28; F16H 2041/285; F16H 41/26
   USPC .................................................. 60/361, 341
   See application file for complete search history.

(56) References Cited

U.S. PATENT DOCUMENTS

| | | | |
|---|---|---|---|
| 5,384,958 A | 1/1995 | O'Daniel et al. | |
| 6,044,946 A * | 4/2000 | Makino | F16H 41/28 192/113.5 |
| 6,065,287 A * | 5/2000 | Yamamoto | F16H 41/26 415/191 |
| 6,125,980 A | 10/2000 | Ruth et al. | |
| 6,220,025 B1 * | 4/2001 | Mauti | F16D 33/04 416/143 |
| 7,866,454 B2 * | 1/2011 | Saka | F16H 45/02 192/110 B |
| 9,540,937 B2 * | 1/2017 | Fingerman | F16H 41/26 |
| 2002/0056600 A1 * | 5/2002 | Fukunaga | F16H 45/02 192/3.29 |
| 2005/0241901 A1 * | 11/2005 | Joo | F16H 45/02 192/3.29 |

(Continued)

FOREIGN PATENT DOCUMENTS

| | | |
|---|---|---|
| JP | 2003-336720 A | 11/2003 |
| JP | 2008-039090 A | 2/2008 |

OTHER PUBLICATIONS

Search Report and Written Opinion of corresponding PCT application.

*Primary Examiner* — Thomas E Lazo
(74) *Attorney, Agent, or Firm* — Davidson, Davidson & Kappel, LLC

(57) ABSTRACT

A method of forming a stator for a torque converter is provided. The method includes casting a stator casting to include a body and blades on an outer circumferential surface of the body. The body includes excess material at an axial surface thereof. The method also includes machining the excess material to balance the stator casting. A torque converter is also provided. The torque converter includes a turbine, an impeller and a stator axially between the turbine and the impeller. The stator includes a stator casting including a body and blades on an outer circumferential surface of the body. The body includes a material segment at an axial surface thereof.

19 Claims, 3 Drawing Sheets

(56) References Cited

U.S. PATENT DOCUMENTS

| | | | |
|---|---|---|---|
| 2008/0190102 A1* | 8/2008 | Kawamura | F16H 41/24 60/365 |
| 2012/0247901 A1* | 10/2012 | Kawahara | F16H 45/02 192/3.28 |
| 2015/0068857 A1* | 3/2015 | Lindemann | F16D 33/18 192/3.28 |
| 2015/0107235 A1* | 4/2015 | Wang | F16H 41/26 60/364 |
| 2015/0125290 A1* | 5/2015 | Dattawadkar | F01D 9/042 415/209.3 |
| 2015/0184701 A1* | 7/2015 | Lindemann | F16D 33/18 60/365 |
| 2015/0369069 A1* | 12/2015 | Smith | F16H 41/04 60/330 |

* cited by examiner

METHOD OF FORMING TORQUE CONVERTER STATOR

The present disclosure relates generally to torque converters and more specifically to stators of torque converters.

BACKGROUND

In order to balance a stator casting prior to use, a brim or a hat of the stator is machined. Such machining may not allow enough imbalance correction, may cause a large increase in scrap and may hurt torque converter characteristics.

SUMMARY OF THE INVENTION

A method of forming a stator for a torque converter is also provided. The method includes casting a stator casting to include a body and blades on an outer circumferential surface of the body. The body includes excess material at an axial surface thereof. The method also includes machining the excess material to balance the stator casting.

A torque converter is also provided. The torque converter includes a turbine, an impeller and a stator axially between the turbine and the impeller. The stator includes a stator casting including a body and blades on an outer circumferential surface of the body. The body includes a material at an axial surface thereof including a first circumferential segment and a second circumferential segment. The first circumferential segment is thicker than the second circumferential segment.

BRIEF DESCRIPTION OF THE DRAWINGS

The present invention is described below by reference to the following drawings, in which.

DETAILED DESCRIPTION

The disclosure provides a method of balancing a stator hub by machining as necessary extra material added to the turbine side of the stator hub in the casting. Thereby, machining is done at the hub and not the hat area thus a design of the blades and core ring of the turbine and/or impeller is not altered.

Figure 1:
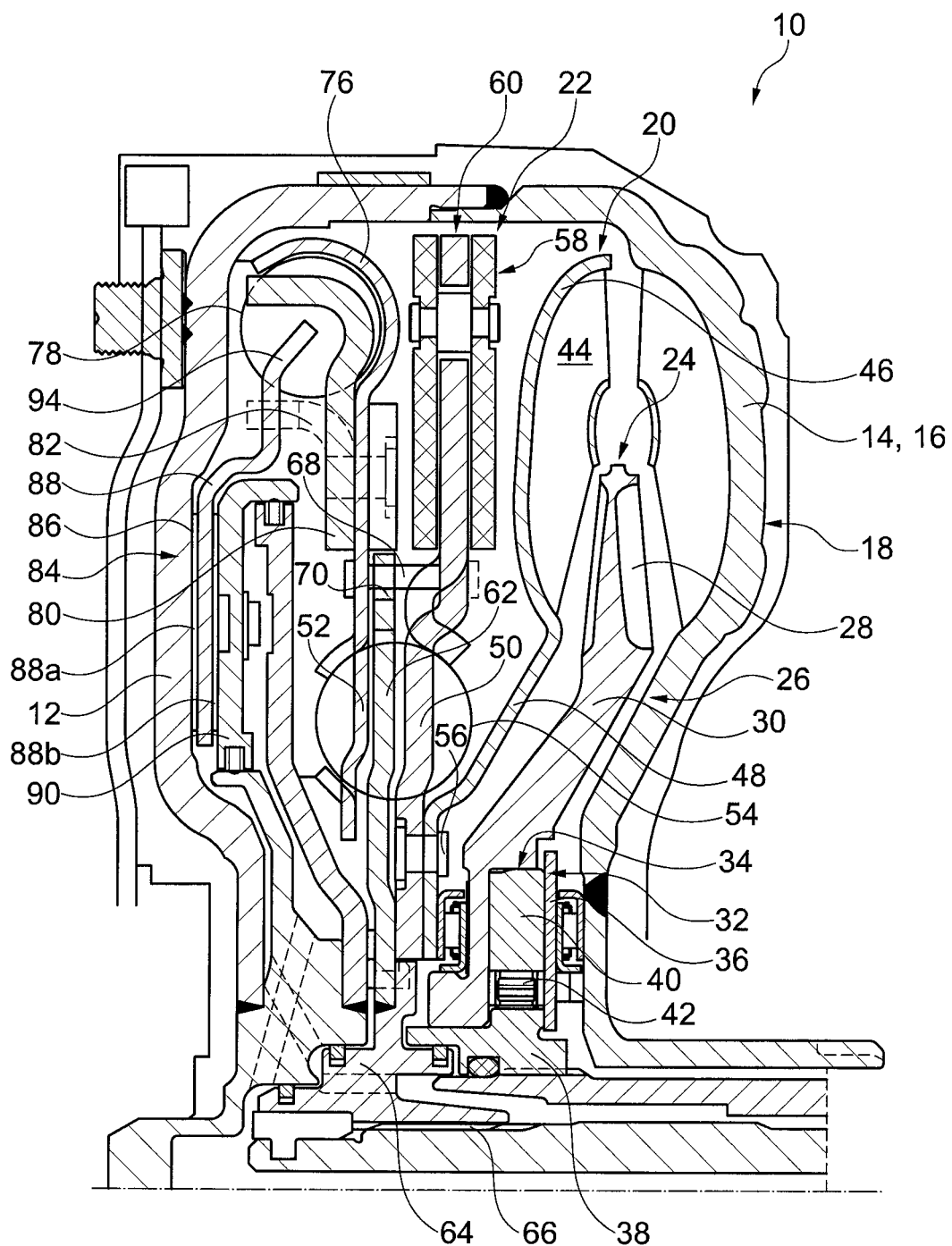
FIG. 1 schematically shows a cross-sectional side view of a torque converter according to an embodiment of the present invention.

FIG. 1 shows a cross-sectional side view of a torque converter 10 in accordance with an embodiment of the present invention. Torque converter 10 is rotatable about a center axis 11 and includes a front cover 12 for connecting to a crankshaft of an internal combustion engine and a rear cover 14 forming a shell 16 of an impeller or pump 18. Front cover 12 includes cup shaped section 12a for connecting to a rear cover 14 and a hub section 12b including a pilot 12c for aligned with the crankshaft. Torque converter 10 also includes a turbine 20, which is positioned opposite impeller 18, and a damper assembly 22 fixed to turbine 20. Torque converter 10 further includes a stator 24 according to an embodiment of the present invention formed in accordance with the method described below with respect to FIGS. 2a and 2b. Stator 24 is axially between impeller 18 and turbine 20 and includes a stator casting 26, which includes a plurality of blades 28 and a stator body 30. Stator 24 also includes a one-way clutch 32 held within an annular recess 34 formed in stator body 30 by a centering plate 36. One-way clutch 32 includes an inner race 38, an outer race 40 and rollers 42 radially between inner race 38 and outer race 40. Stator casting 26 is rotationally fixed to outer race 40, and depending on the operating conditions of torque converter 10, inner race 38 and outer race 40 are rotationally fixed to each other or rotatable relative to each other. A first axial thrust bearing 43a is provided between stator 24 and impeller 18 and a second axial thrust bearing 43b is provided between stator 24 and turbine 20.

Turbine 20 includes a plurality of blades 44 supported on a rounded portion 46 of turbine 20 at a rear-cover side of turbine 20. Turbine 20 further includes an inner radial extension 48 protruding radially inward from rounded portion 46. On a front-cover side of turbine 20, turbine 20 is connected to damper assembly 22. Damper assembly 22 includes two cover plates 50, 52 supporting an inner set of springs 54 axially therebetween, with the turbine-side cover plate 50 being riveted to turbine 20 by a plurality of circumferentially spaced rivets 56. Damper assembly 22 further includes a centrifugal pendulum vibration absorber 58 at a radially outer end 60 of cover plate 50 and a drive flange 62 positioned axially between cover plates 50, 52. Drive flange 62 includes a drive hub 64 at an inner radial end thereof including splines 66 on an inner circumferential surface thereof configured for nonrotatably connecting to a transmission input shaft. Cover plates 50, 52 transfer torque from turbine 20 to drive flange 62 via springs 54. Drive flange 62 in turn drives the transmission input shaft via hub 64. Radially outside of springs 54, cover plates 50, 52 are riveted together by a plurality of circumferentially spaced rivets 68. Rivets 68 pass through cover plates 50, 52 into circumferential spaces formed between outer tabs 70 extending from a radial outer end of drive flange 62.

A radially outer end of cover plate 52 forms a spring retainer 76 retaining a set of radially outer springs 78. A further plate 80 of damper assembly 22 is riveted to a front cover side of cover plate 52 and extends into circumferential spaces between springs 78 to contact circumferential ends of springs 60. Plate 80 further includes projections 82 extending axially away from cover plate 52.

Torque converter 10 also includes a lockup clutch 84 formed by an inner axial surface 86 of front cover 12, a clutch plate 88 and a piston 90. Clutch plate 88 includes friction material 88a, 88b on both axial surfaces thereof. A first friction material 88a is configured for contacting inner axial surface 86 and a second friction material 88b is configured for contacting piston 90. Clutch plate 88 further includes drive projections 94 on a radial outer end thereof extending through circumferential spaces between projections 82 and into the circumferential spaces between springs 78.

Figure 2C:
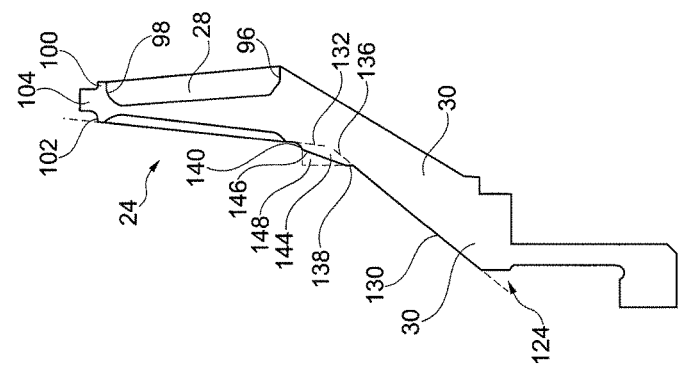
FIGS. 2a to 2c illustrate a method of forming a stator in accordance with an embodiment of the present invention.
Figure 2B:
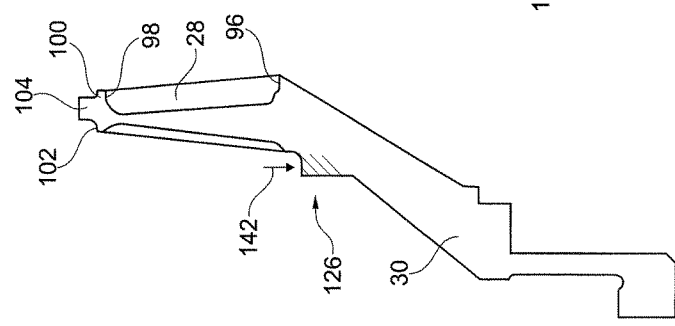
Figure 2A:
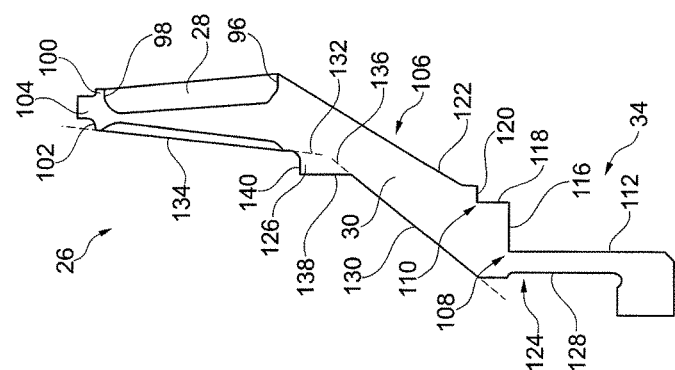

FIGS. 2a to 2c illustrate a method of forming stator 24 in accordance with an embodiment of the present invention. Stator 24 includes blades 28 for redirecting the torque converter fluid supported radially between an outer circumferential surface 96 of stator body 30 and an inner circumferential surface 98 of a brim 100. On an outer circumferential surface 102 of brim 100, stator 24 includes a hat 104 protruding radially outward from brim 100 to define a radially outermost edge of stator 24. Stator body 30 includes annular recess 34 formed in an impeller-side axial surface 106 thereof receiving one-way clutch 32 (FIG. 1). Annular recess 34 is defined by two step portions—an radially inner step portion 108 receiving inner race 38, outer race 40 and rollers 42 and a radially outer step portion 110 receiving centering plate 36. Radially inner step portion 108 includes a radially extending surface 112 extending radially outward from an innermost circumferential surface 114 of stator casting 26 and an axially extending circumferential surface 116 extending from a radially outer edge of radially extending surface 120. Radially outer step portion 110 includes a radially extending surface 118 extending radially outward from axially extending circumferential surface 116 of step portion 108 and an axially extending circumferential surface 120 extending from a radially outer edge of radially extending surface 118 to axial surface 106. In this embodiment, axial surface 106 extends axially and radially away from surface 120 radially toward blades 28 and axially toward impeller 18 (FIG. 1) to form a tapered surface 122 between recess 34 and blades 28.

Opposite of axial surface 106, casting 26, at a turbine-side axial surface 124 of stator body 30, includes an excess material ring 126 at a radial outer end of body 30, just inside of blades 28. In other embodiments, the excess material ring 126 may be formed on the impeller-side axial surface 106. Axial surface 124 includes a flat thrust surface 128 extending perpendicular to a center axis of stator 24 for contacting axial thrust bearing 43b. Radially outside of thrust surface 128, axial surface 124 includes a tapered surface 130 extending axially and radially away from flat surface 128 radially toward blades 28 and axially toward impeller 18 (FIG. 1). Excess material ring 126 is provided at an outer radial edge of tapered surface 130, between tapered surface 130 and blades 28 to allow for balancing stator casting 26 after it is casted. Material ring 126 protrudes axially past a plane 132 of turbine-side axial edges 134 of blades and axially past a plane 136 of tapered surface 130. In this embodiment, material ring 126 is step shaped and includes a radially extending surface 138 extending radially outward from tapered surface 130 and an axially extending circumferential surface 140 extending axially from a radially outer edge of radially extending surface 138 to plane 132.

FIG. 2b illustrates the machining of material ring 126 during a balancing operation to provide for imbalance correction. During the balancing, innermost circumferential surface 114 is provided onto a support and stator casting 26 is rotated about its center axis by a portion of the 360 degree revolution, which is less than or equal to 120 degrees. While stator casting 26 is being rotated for a degree amount that is less than or equal to 120 degrees, a machining tool is applied in a tool direction 142 to apply a radially inward force to create a balancing cut at a common depth to remove a portion of material ring 126, in particular an arc portion (i.e., a circumferential segment of less than or equal to 120 degrees of ring 126), which is illustrated by hatching, as necessary to properly balance stator casting 26. More specifically, a majority of radially extending surface 138 extending radially outward from tapered surface 130 and an axially extending circumferential surface 140 are removed over the circumferential range, i.e., the range of less than or equal to 120 degrees. The exact angle on each part produced varies based on the amount of correction needed. 120 degrees is set as a maximum threshold because any material removed over this ranged no longer is beneficial for changing the component imbalance due to the short distance to the centerline of the imbalance vector.

FIG. 2c illustrates stator casting 26 after the machining of material ring 126 described with respect to FIG. 2b. As shown in FIG. 2c, over the circumferential range in which a portion of the excess material ring 126 is removed, a material arc segment 144 remains on axial surface 124 of body 30 radially outside of tapered surface 130 and radially inside of blades 28. Material arc segment 144 is of sufficient size and configuration such that stator casting 26 is properly balanced during operation of torque converter 10. In this embodiment, material arc 144 still protrudes axially past planes 132, 136, but to a less degree than material ring 126, and includes a tapered axial surface 146 extending axially and radially away from the remaining portion of radially extending surface 138 to the remaining portion of axially extending circumferential surface 140 such that surface 146 is tapered toward blades 28. Removing of the circumferential segment to form material arc 144 leaves an arc segment 148 of material ring 126 intact on axial surface 124, as schematically shown in FIG. 2c. Because arc segment 148 is of the same shape as material ring 126 when view cross-sectionally as in FIG. 2c, circumferential segment 148 is thicker than material ring, more specifically in both the axial and radial directions.

Figure 3:
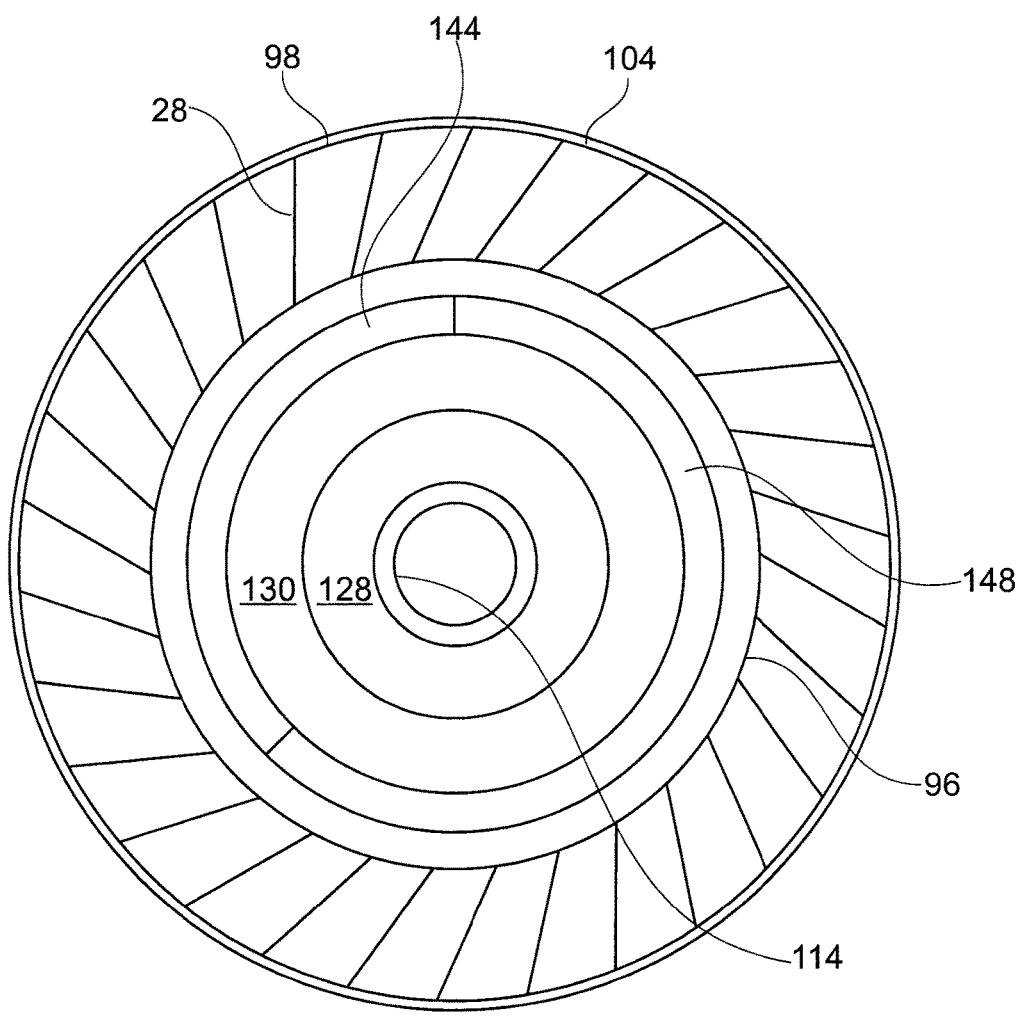
FIG. 3 schematically shows a plan view of the stator casting of the stator after the machining of a material ring.

To further illustrate the shape of segments 144, 148, FIG. 3 schematically shows a plan view of stator casting 26 after the machining of material ring 126. Arc segment 144 has a smaller circumferential length than thicker arc segment 148, with arc segment 144 extending 120 degrees or less and arc segment 148 extending 240 degrees or greater.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A method of forming a stator for a torque converter comprising:
   casting a stator casting to include a body and blades on an outer circumferential surface of the body, the body including excess material protruding at an axial surface thereof; and
   machining the excess material to balance the stator casting so as to decrease the amount the excess material protrudes at the axial surface.

2. The method as recited in claim 1 wherein the excess material is a ring.

3. The method as recited in claim 1 wherein the axial surface includes a tapered surface, the excess material being radially outside of the tapered surface.

4. The method as recited in claim 1 wherein the excess material includes a radially extending surface and an axially extending surface, the machining including removing at least a portion of the radially extending surface and removing at least a portion of the axially extending surface.

5. The method as recited in claim 4 wherein after the machining the excess material, a material segment of the excess material remains.

6. The method as recited in claim 5 wherein the material segment includes an axial surface extending from a remaining portion of the radially extending surface to a remaining portion of the axially extending surface.

7. The method as recited in claim 6 wherein the axial surface of the material segment extends axially and radially away from the remaining portion of the radially extending surface to the remaining portion of the axially extending surface such that the axial surface of the material segment is tapered toward the blades.

8. The method as recited in claim 1 wherein the machining includes applying a radially inward force to remove portions of the excess material.

9. The method as recited in claim 1 wherein machining the excess material to balance the stator casting includes removing a circumferential segment of the excess material.

10. A torque converter comprising:
   a turbine,
   an impeller; and
   a stator axially between the turbine and the impeller, the stator including a stator casting including a body and blades on an outer circumferential surface of the body, the body including a material at an axial surface thereof including a first circumferential segment and a second circumferential segment, the first circumferential segment protruding at the axial surface and being thicker than the second circumferential segment, wherein the second circumferential segment includes a radially extending surface, an axially extending surface and an axial surface extending from the radially extending surface to the axially extending surface.

11. The torque converter as recited in claim 10 wherein the first circumferential segment and second circumferential segment are arcs that together form a ring.

12. The torque converter as recited in claim 10 wherein the first circumferential segment has a greater circumferential length than the second circumferential segment.

13. The torque converter as recited in claim 10 wherein the axial surface of the second circumferential segment extends axially and radially away from the radially extending surface to the axially extending surface such that the axial surface of the second circumferential segment is tapered toward the blades.

14. The torque converter as recited in claim 10 wherein the axial surface of the body includes a tapered surface, the first and second circumferential segments being radially outside of the tapered surface.

15. A method of forming a stator for a torque converter comprising:
   casting a stator casting to include a body and blades on an outer circumferential surface of the body, the body including excess material at an axial surface thereof; and
   machining the excess material to balance the stator casting,
   wherein the axial surface includes a tapered surface, the excess material being radially outside of the tapered surface.

16. The method as recited in claim 15 wherein the excess material includes a radially extending surface and an axially extending surface, the machining including removing at least a portion of the radially extending surface and removing at least a portion of the axially extending surface.

17. The method as recited in claim 16 wherein after the machining the excess material, a material segment of the excess material remains.

18. The method as recited in claim 17 wherein the material segment includes an axial surface extending from a remaining portion of the radially extending surface to a remaining portion of the axially extending surface.

19. The method as recited in claim 18 wherein the axial surface of the material segment extends axially and radially away from the remaining portion of the radially extending surface to the remaining portion of the axially extending circumferential surface such that the axial surface of the material segment is tapered toward the blades.

* * * * *